United States Patent [19]
Azuma et al.

[11] Patent Number: 4,842,840
[45] Date of Patent: Jun. 27, 1989

[54] METHOD FOR PRODUCTION OF OXIDATION-RESISTANT SIALON AND SILICON CARBIDE MATERIALS

[75] Inventors: Nobuyuki Azuma, Kasugai; Kazuo Nakamura, Owari-Asahi; Minoru Maeda, Konan; Mamoru Yamada, Nagoya, all of Japan

[73] Assignee: Agency of Industrial Science & Technology, Ministry of International Trade & Industry, Tokyo, Japan

[21] Appl. No.: 140,995

[22] Filed: Jan. 5, 1988

[30] Foreign Application Priority Data

Jan. 8, 1987 [JP] Japan .................................. 62-2446
Jan. 8, 1987 [JP] Japan .................................. 62-2447

[51] Int. Cl.$^4$ ........................ B05G 3/02; C01B 31/36
[52] U.S. Cl. .................................. 423/345; 156/664; 156/667; 427/154; 427/376.1; 427/376.2; 427/377
[58] Field of Search ..................... 427/377, 376.2, 154, 427/376.1; 423/345; 156/664, 667

[56] References Cited

U.S. PATENT DOCUMENTS 4,664,946  5/1987  Enomoto et al. ................ 427/376.2

Primary Examiner—John Doll
Assistant Examiner—Lori S. Freeman
Attorney, Agent, or Firm—Oblon, Fisher, Spivak, McClelland & Maier

[57] ABSTRACT

An oxidation-resistant sialon material and an oxidation-resistant silicon carbide material each containing a phase of closely packed crystals in the surface region are produced by coating a sialon substrate and a silicon carbide substrate with a layer of an alkali metal compound and a layer of a mixture of an alkali metal compound and a carbonaceous substance respectively, firing the resultant coated substrate at a temperature in the range of 800° to 1,300° C. thereby forming an alkali metal-containing vitreous coating layer on each substrate, and thereafter removing the each coating layer.

6 Claims, 1 Drawing Sheet

METHOD FOR PRODUCTION OF OXIDATION-RESISTANT SIALON AND SILICON CARBIDE MATERIALS

BACKGROUND OF THE INVENTION

1. Field of the Invention

This invention relates to a method for the production of a sialon material and a silicon carbide material with improved properties obtained by forming a phase of closely packed crystals in the surface region. More particularly, this invention relates to a method for the production of a sialon material and a silicon carbide material exhibiting a notable improvement in such qualities as oxidation-resistance, resistance to heat, resistance to thermal shock, corrosion-resistance, and mechanical strength by giving a specific surface treatment to respective raw materials thereby giving rise to a phase of closely packed crystals in the surface region of raw material.

2. Prior Art Statement

Sialon is a compound consisting of silicon, aluminum, oxygen, and nitrogen atoms as represented by the following formula:

$$Si_{6-z}Al_zO_zN_{8-z} \qquad (1)$$

(wherein z stands for 0-4).

Sintered articles of this compound excel in resistance to heat, resistance to thermal shock, and mechanical strength and, what is more, exhibit highly desirable corrosion-resistance to molten aluminum, copper, and iron, for example, and therefore are expected to find growing utility as structural materials.

These sintered article of sialon can be manufactured relatively easily, for example, by the hot press method which comprises mixing silicon nitride powder with aluminum nitride powder and aluminum oxide powder and heating the resultant mixed powder at elevated temperatures under high pressure. Recently, sintered articles of sialon possessed of highly desirable properties are produced by the normal-pressure sintering method.

Sintered articles of silicon carbide excel in heat-resistance, corrosion-resistance, and mechanical properties such as rigidity, bending strength, and modulus of elasticity. Efforts are being made to promote utility of the sintered articles of silicon carbide as heat-resistant structural materials for use in gas turbines and automobile engines, for example. They are expected to enjoy expanding utilization in the future.

The sintered articles of silicon carbide, however, entail a weak point common to all non-oxides, i.e. a serious drawback that they are liable to be oxidized in the air at elevated temperatures and that, particularly in the presence of steam, they are corroded to form a vitreous texture containing pores in the surface region and suffer from degradation of physical properties. For the elimination of this drawback, there have been proposed various methods such as, for example, the normal-pressure sintering method which comprises mixing silicon carbide powder with a specific metal and a carbon and heating the resultant mixture at an elevated temperature to effect reaction, the reaction sintering method which comprises mixing silicon carbide powder with carbon and feeding silicon to the reaction system from outside, and the hot press method which comprises mixing silicon carbide powder with a catalyst and heating the resultant mixture at an elevated temperature under high pressure.

The sintered articles of sialon and silicon carbide which are produced by the methods mentioned above are such that their sections are found to contain numerous pores measuring approximately in the range of 1 to several microns in diameter.

When a sintered article contains such pores, it is liable to undergo oxidation in the air at an elevated temperature and incur various undesirable phenomena. For example, the oxygen in the air diffuses through these pores in the sintered article to form a thin amorphous film of silicon dioxide first at a temperature of about 700° C. and, then at a still higher temperature of 1,200° C., induce formation of cristobalite crystals. In the sintered article of sialon, low melting oxide products comprising a mullite phase, a vitreous phase and a phase of grain boundary impurity aggregate occur and, in the sintered article of silicon carbide, silicates and glass containing pores and cracks occur respectively in the surface region. As a result, the sintered articles suffer from degradation of physical properties and incur occurrence of cracks.

When the sialon material and the silicon carbide material do not possess a compact texture but contain pores as described above, they are deficient in resistance to oxidation at elevated temperatures and have only limited utility as heat-resistant structural materials intended for exposure to elevated temperatures. It is, therefore, considered necessary to impart high-temperature oxidation-resistance to the sialon material and the silicon carbide material by allowing the materials to form a compact protective layer in the surface region thereof.

No method has yet been developed which enables an oxidation-resistant protective layer exhibiting highly desirable adhesiveness to a substrate and possessing a thermal expansion coefficient approximating that of the substrate to be formed uniformly and inexpensively on the surface of a substrate, particularly on a substrate with a large surface area and a complicated shape.

OBJECT AND SUMMARY OF THE INVENTION

An object of this invention is to provide inexpensively a sialon material or silicon carbide material excelling in various physical properties represented by oxidation-resistance by forming on the surface of a sialon substrate or silicon carbide substrate of desired shape a coating layer possessing a thermal expansion coefficient similar to that of the aforementioned substrate by a very simple procedure with high uniformity ad adhesiveness.

The inventors continued a study with a view to developing a sialon material and a silicon carbide material excelling in oxidation-resistance. As a result of this study, they have found that the aforementioned oxidation-resistant material possessing a phase of closely packed crystals in the surface region thereof is obtained by forming a layer of an alkali compound on the surface of a sialon substrate or a layer of a mixture of an alkali metal compound and a carbonaceous substance on the surface of a silicon carbide substrate, firing the resultant product having superposed layers at a prescribed temperature thereby giving rise to a homogeneous phase of silicon nitride and sialon crystals in the surface region in the case of the sialon substrate or a homogeneous phase of silicon carbide crystals in the surface region in the case of the silicon carbide substrate and forming a coating layer of an alkali metal-containing vitreous substance on either of the aforementioned phases of crystals, and then removing the coating layer. The present invention has been perfected based on this finding. To be specific, the present invention is directed to a method for the production of an oxidation-resistant sialon material or an oxidation-resistant silicon carbide material possessing a phase of closely packed crystals in the surface region thereof, which method comprises covering a surface of a sialon substrate with a layer of an alkali metal compound or a surface of a silicon carbide substrate with a layer of a mixture of an alkali metal compound and a carbonaceous substance, firing the resultant coated substrate at a temperature in the range of 800° to 1,300° C. in the presence of oxygen thereby forming a coating layer of an alkali metal containing vitreous substance on the surface of the substrate, and subsequently removing the coating layer.

The above and other objects and features of the invention will become more apparent from the following detailed description with reference to the accompanying drawings.

DETAILED DESCRIPTION OF THE PREFERRED EMBODIMENTS

Figure 1:
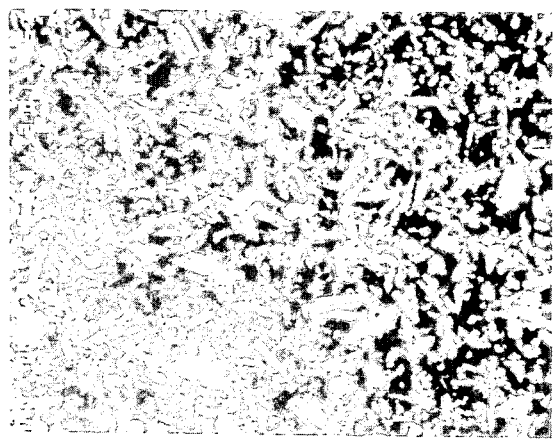
FIG. 1 illustrates the crystalline structure in the surface region of a sialon material produced in Example 1, photographed under a scanning electron microscope at 1,000 magnifications.

The sialon substrate and the silicon carbide substrate to be used in the method of the present invention can be porous sintered articles of sialon and silicon carbide which are obtained by any of the conventional methods such as, for example, the normal-pressure sintering method, the reaction sintering method, and the hot-press sintering method. The present invention does not discriminate among these substrates by shape or size. These substrates can be used in any desired shape and size.

As examples of the alkali metal compound to be used advantageously for the formation of a layer on the surface of a substrate, there can be cited halogenides, carbonates, nitrates, and sulfates of such alkali metals as lithium, potassium, and sodium. It is optional to use one member or a combination of two or more members selected freely from the group of alkali metal compounds enumerated above. Such an alkali metal compound may be used in the original form of powder or in the prepared form of an aqueous solution. When it is used in the form of powder, the powder is generally desired to have a particle diameter of not more than 20 $\mu$m.

In the case of the silicon carbide substrate, the aforementioned alkali metal compound must be used in combination with a carbonaceous substance. As examples of the carbonaceous substance usable advantageously herein, there can be cited elementary carbon available in the form of particles, and hydrocarbons such as cane sugar and starch. Generally, the gravimetric ratio of the alkali metal compound to the carbonaceous substance falls in the range of 1:0.1 to 1:2. In either case, the alkali metal compound or the mixture thereof with the carbonaceous substance is desired to be applied on the substrate as by means of spraying in an amount calculated to produce a layer of 2 to 30 mg as alkali metal per unit area ($cm^2$). In the course of the deposition of the layer of the alkali metal compound or the mixture, there may be used a binder such as methyl cellulose or dextrin, when necessary, for the purpose of fortifying the surface of the applied layer after drying. The amount of the binder thus used generally falls in the range of 10 to 30 mg, based on 2 g of the alkali metal compound. To be specific, the use of the binder for the aforementioned purpose is effected by adding 10 to 30 mg of the binder to 2 g of the alkali metal compound, dissolving the resultant mixture in 20 ml of distilled water to produce an aqueous solution, and applying this aqueous solution to the surface.

Then, the substrate on which the layer of the alkali metal compound or the layer of the mixture of the alkali metal compound with the carbonaceous substance has been applied is fired at a temperature in the range of 800° to 1,300° C., preferably 850° to 1,100° C., in the presence of oxygen. This firing is generally carried out in the air. It may be carried out, when desired, in a mixed gas consisting of oxygen and an inert gas such as nitrogen or argon or in a mixed gas consisting of the air and the same inert gas. The time for sufficient firing generally falls in the range of 5 to 30 hours.

The thickness of the surface region roughly falls in the range of 10 to 30 $\mu$m.

Now, the reasons for the selection of the various ranges of numerical values mentioned above will be described below.

Though the uniformity with which the reaction proceeds increases with the increasing fineness of the particle diameter of the alkali metal compound, the particle diameter of not more than 20 $\mu$m is fine enough for the reaction contemplated by the present invention.

If the amount of the carbonaceous substance applied on the silicon carbide substrate does not reach 0.1 part, based on 1 part of the alkali metal compound, as it is difficult for the reaction represented by formula (9) described later to proceed, sufficient formation of silicon carbide is not obtained. If this amount exceeds 2 parts, the crystallinity of silicon carbide is impaired because the unaltered carbon occurs in an amount more than is necessary for the reaction of the formula (9) for the formation of silicon carbide and, what is more, the interior of the furnace is fouled with alkali-containing carbon.

If the amount of the alkali metal compound applied on the substrate is less than 2 mg per the unit area ($cm^2$), the desired effect of the layer of the alkali metal compound is not obtained. If this amount exceeds 30 mg, the interior of the furnace is fouled.

The amount of the binder to be used generally falls in the range of 10 to 30 mg per 2 g of the alkali metal compound. Specifically, the use of the binder is attained by adding 10 to 30 mg of the binder to 2 g of the alkali metal compound and dissolving the resultant mixture in 20 ml of distilled water.

In consequence of the firing treatment mentioned above, a homogeneous phase of silicon nitride and sialon crystals is formed in the surface region of the sialon substrate or a similarly homogeneous phase of silicon carbide crystals is formed in the surface region of the silicon carbide substrate and, in either case, a coating layer of an alkali metal-containing vitreous substance is formed on the aforementioned phase.

The phase of crystals and the coating layer mentioned above are believed to result from the following reactions.

When either of the coated substrates is fired at a temperature in the range of 800° to 1,300° C. in the presence of oxygen, the coated layer of the alkali metal compound is first melted and converted into a liquid phase. The oxidation ensues and proceeds through the medium of this liquid phase.

Now, this mechanism will be described below with respect to the sialon substrate and the silicon carbide substrate.

In the case of the sialon substrate, silicon nitride is oxidized with evolution of gaseous silicon monoxide as indicated by the formula (2). In the aforementioned liquid phase, this gaseous silicon monoxide is decomposed into gaseous silicon dioxide and gaseous silicon as indicated by the formula (3). Then, the gaseous silicon reacts with the nitrogen dissolved in the liquid phase formed in the reaction of the formula (2), with the result that silicon nitride crystals are formed as indicated in the formula (4) to produce a phase of closely packed silicon nitride crystals in the surface region of the substrate.

$$Si_3N_4 + 3/2O_2 \rightarrow 3SiO(g) + 2N_2(g) \tag{2}$$

$$3SiO(g) \rightarrow 1.5SiO_2(g) + 0.5Si_3(g) \tag{3}$$

$$0.5Si_3(g) + N_2(g) \rightarrow 0.5Si_3N_4(S) \tag{4}$$

(wherein (g) stands for gaseous state and (S) for solid state).

The silicon nitride which is formed by the reaction of the aforementioned formula (4), on analysis by the X-ray diffraction, is found to be stable $\beta$-Si$_3$N$_4$.

When the sialon has a composition such that the value of "z" in the aforementioned general formula (1) is large (not less than 2, for example) and the AlN and Al$_2$O$_3$ components are large, the gaseous silicon dioxide formed by the reaction of the formula (3) reacts with aluminum to form mullite (3Al$_2$O$_3$.2SiO$_2$) as indicated by the formula (5) and the phase of crystals consequently formed, therefore, consists of silicon nitride and mullite $$1.5SiO_2(g) + 4.5Al(S) \rightarrow 2.25Al_2O_3.1.5SiO_2(S) \tag{5}$$

By the treatment with phosphoric acid or hydrofluoric acid in the subsequent step, this mullite is dissolved in the form of a silicate moiety. From the standpoint of the compactness of the phase of crystals so formed, therefore, the sialon substrate to be used as the raw material is desired to possess a composition such that the value of "z" in the aforementioned general formula (1) is up to and not more than 2.

In the meantime, the gaseous silicon dioxide which is formed in the reaction of the formula (3) is mostly dissolved in the aforementioned liquid phase and then caused to react with the alkali metal oxide as indicated by the formula (6) shown below to give rise to an alkali metal-containing vitreous substance.

As a result, a coating layer of this alkali metal-containing vitreous substance is formed on the aforementioned phase of crystals such as of silicon nitride.

$$M_2O(l) + 1.5SiO_2(g) \rightarrow \tfrac{1}{2}M_2SiO_3(S) + \tfrac{1}{2}M_2Si_2O_5(S) \tag{6}$$

(wherein M stands for an alkali metal, (l) for liquid state, and (S) for solid state).

In the case of the silicon carbide substrate, silicon carbide is oxidized as indicated by the formula (7) to produce gaseous silicon monoxide. In the aforementioned liquid phase, this gaseous silicon monoxide is decomposed into gaseous silicon dioxide and gaseous silicon as indicated by the formula (8). Then, this gaseous silicon reacts with the carbon contained in the aforementioned liquid phase resulting from the reaction of the formula (7) or with the carbon originating in the carbonaceous substance, to give rise to silicon carbide crystals through the reaction of the formula (9). As a result, a phase of closely packed silicon carbide crystals is formed in the surface region of the substrate.

$$3SiC + 3/2O_2 \rightarrow 3SiO(g) + 3C(S) \tag{7}$$

$$3SiO(g) \rightarrow 1.5SiO_2(g) + 0.5Si_3(g) \tag{8}$$

$$0.5Si_3(g) + 1.5C(S) \rightarrow 1.5SiC(S) \tag{9}$$

This silicon carbide formed by the aforementioned reaction of the formula (9), on analysis by the X-ray diffraction, is found to be $\beta$-SiC, which is believed to form stably at low temperatures.

The gaseous silicon dioxide formed by the reaction of the formula (8) exhibits entirely the same behavior as in the reaction of the sialon substrate, to give rise to an alkali-containing vitreous substance by the reaction of the formula (6). As a result, a coating layer of this alkali metal-containing vitreous substance is formed on the aforementioned layer of silicon carbide crystals.

The coating layer of the alkali metal-containing vitreous substance which is formed as described above possesses a low melting point and, therefore, must be removed. This removal of the coating layer can be attained, for example, by immersing the substrate in an aqueous phosphoric acid solution and allowing it to stand therein at a temperature in the range of 200° to 300° C. for a period of about 5 minutes to one hour or by allowing the substrate to stand in an aqueous solution of 5 to 20% by weight of hydrofluoric acid at room temperature for a period of about 5 minutes to 1 hour.

As a result, the phase of closely packed crystals is formed in the surface region of the substrate. In the case of the sialon substrate, the phase of crystals, on analysis by the X-ray diffraction and the observation under a microscope, is found to possess the following sialon composition. This phase is found to be formed with closely packed fibrous crystals, which roughly measure 0.5 to 2 $\mu$m in thickness and 3 to 7 $\mu$m in length where the value of "z" in the aforementioned general formula is 1, 1 to 2 $\mu$m in thickness and 3 to 5 $\mu$m in length where the value of "z" is 2, or 1 to 2 $\mu$m in thickness and 2 to 3 $\mu$m in length where the value of "z" is 3. The individual crystals are formed with a solid solution of aluminum oxide in $\beta$-silicon nitride.

The silicon carbide substrate, on observation under a microscope, is found to comprise fibrous crystals 2 to 4 $\mu$m in thickness and 5 to 10 $\mu$m in length and partially flat crystals closely superposed. This phase of crystals, on analysis by the X-ray diffraction, is found to be a single phase formed with stable $\beta$-silicon carbide.

In accordance with the present invention, a phase of uniformly and closely packed crystals of $\beta$-silicon nitride and $\beta'$-sialon or silicon carbide is formed in the surface region of the sialon substrate or the silicon carbide substrate possessing desired shape inexpensively by a very simple procedure. The sialon material or the silicon carbide material obtained as described above excels in resistance to heat and resistance to thermal shock and enjoys notably improvement in oxidation-resistance and mechanical strength and proves to be useful as an industrial material, e.g. as a heat-resistant structural material, as a material for automobile engine and gas turbine parts and as a high-temperature oxidation-resistant and corrosion-resistant material for space and ocean research, chemical ecology and coal equipment.

Now, the present invention will be described more specifically below with reference to working examples. It should be noted, however, that this invention is not limited in any way by these examples. (production of sialon material)

EXAMPLE 1

On the surface (5.8 cm$^2$ in area) of a normal-pressure sintered piece of sialon (z=1) heated to about 100° C., a solution of 2 g of lithium carbonate and 10 mg of methyl cellulose in 20 ml of distilled water was applied with a caligraphy brush uniformly in an amount calculated to distribute lithium at a rate of 30 mg per cm$^2$. The applied layer of the solution was then dried. The sample thus prepared was mounted on a boat of silicon carbide, covered with a lid, set in place roughly at the center of a high alumina combustion tube, and fired at 950° C. for 24 hours while being swept with a current of air passed at a rate of 500 ml/min. Consequently, there was obtained a sialon mass coated uniformly with a white opaque vitreous texture of lithium silicate. This mass, on analysis by the X-ray diffraction, was found to have produced only $\beta$-silicon nitride under the aforementioned vitreous texture.

Then, the sialon mass was placed in 12 ml of an aqueous phosphoric acid solution and heated therein to effect expulsion of water by vaporization. It was gradually heated to 260° C., held at this temperature for 15 minutes. It was then removed from the solution, washed with water, and dried. This treatment resulted in complete removal of the vitreous substance. Then, the surface region of this mass was observed under a scanning electron microscope. A photograph of the structure taken at 1,000 magnifications through the microscope is shown in FIG. 1. This photograph clearly shows formation of fibrous crystals 0.2 to 2 $\mu$m in thickness and 3 to 8 $\mu$m in length throughout the entire field. This phase of crystals, on analysis by the X-ray diffraction, was identified to be a single phase of $\beta$-silicon nitride.

EXAMPLE 2

On the surface (5.8 cm$^2$ in area) of a sintered sialon (z=1) piece, a solution of 2 g of lithium fluoride and 10 mg of methyl cellulose in 20 ml of distilled water was applied with a caligraphy brush in an amount calculated to distribute lithium at a rate of 20 mg per cm$^2$. The applied layer of the solution was dried. The sample thus prepared was placed in a furnace similarly to Example 1 and rapidly heated from room temperature to 850° C. and then heated slowly to 950° C. over a period of 16 hours, with the sample kept swept with a current of dry air passed at a rate of 300 ml/min.

Consequently, there was obtained a sialon mass coated uniformly with a vitreous texture of lithium. This sialon mass, on analysis by the X-ray diffraction was found to have formed only $\beta$-silicon nitride under the vitreous texture.

Then, the sintered sialon mass was treated with phosphoric acid by following the procedure of Example 1 to effect removal of the vitreous substance. After the removal of this vitreous substance, the sintered mass was found to have $\beta$-silicon nitride crystals 1 to 2 $\mu$m in thickness and 5 to 9 $\mu$m in length formed throughout the entire surface region.

EXAMPLE 3

A sample was prepared by following the procedure of Example 1, except that potassium carbonate was used in place of lithium carbonate. This sample was placed in a furnace and fired by being rapidly heated from room temperature to 950° C. and then kept at this temperature for 24 hours, with the sample kept swept with a current of air and a current of nitrogen passed respectively at 300 ml/min and 100 ml/min. Consequently, there was obtained a sialon mass coated with a potassium-containing vitreous substance.

Then, the sialon mass was immersed for 15 minutes in a solution of 1 part by weight of an aqueous 46 wt % hydrofluoric acid solution in 3 parts by weight of distilled water. After the immersion, the sialon mass was placed in an aqueous ammonia solution to effect removal of residual hydrofluoric acid, washed with water, and dried. In the surface region of this mass, fibrous $\beta$-silicon nitride crystals 0.2 to 15 $\mu$m in thickness and 3 to 7 $\mu$m in length were uniformly formed.

EXAMPLE 4

A sample was prepared by using a hot-press sintered sialon mass (z=1) instead and following the procedure of Example 1, except that sodium carbonate was used in place of lithium carbonate. This sample was placed in the furnace and then fired by being rapidly heated from room temperature to 1,000° C. and then kept at this temperature for 24 hours, with the sample kept swept with a current of air and a current of nitrogen passed respectively at 300 ml/min and 200 ml/min. Consequently, there was obtained a sialon mass coated with a white sodium silicate texture. The white sodium silicate texture was found to comprise a large portion of a vitreous phase and a small portion of aluminum silicate phase. Then, the sialon mass was subjected to the treatment with phosphoric acid by following the procedure of Example 1, then washed with water, and dried. In the surface region of this mass, fibrous crystals 1 to 1.5 $\mu$m in thickness and 3 to 9 $\mu$m in length were formed uniformly.

The crystals, on analysis by the X-ray diffraction, were found to be a single phase of $\beta$-silicon nitride.

EXAMPLE 5

A sample was prepared by following the procedure of Example 1, except that a normal-pressure sintered sialon piece (z=2) was used instead. This sample was placed in a furnace and then fired by being heated rapidly from room temperature to 1,000° C. and kept at this temperature for 24 hours, with the sample kept swept with a current of air passed at a rate of 500 ml/min. Consequently, there was obtained a sialon mass coated uniformly with a vitreous texture of lithium silicate. The vitreous texture comprised a vitreous phase and an aluminum silicate phase.

Then, the sialon mass was subjected to the treatment with phosphoric acid by following the procedure of Example 1, then washed with water, and dried. In the surface region of this mass, β-sialon crystals 1 to 2 μm in thickness and 3 to 5 μm in length presumably resulting from solid solution of aluminum oxide in silicon nitride were uniformly formed.

EXAMPLE 6

A sample was prepared by following the procedure of Example 1, using a normal-pressure sintered sialon piece (z=3) and lithium carbonate. This sample was placed in a furnace and then fired by being heated rapidly from room temperature to 1,000° C. and kept at this temperature for 24 hours, with the sample kept swept with a current of air passed at a rate of 300 ml/min. Consequently, there was obtained a sialon mass uniformly coated with a vitreous texture of potassium silicate. The vitreous texture comprises a vitreous phase and an aluminum silicate phase.

Then, the sialon mass was subjected to the treatment with phosphoric acid by following the procedure of Example 1, then washed with water, and dried. In the surface region of this mass, β'-sialon crystals 1 to 1.5 μm in thickness and 2 to 5 μm in length presumably resulting from solid solution of aluminum oxide in silicon nitride were formed.

EXAMPLE 7

A sample was prepared by following the procedure of Example 1, except that a mixture consisting of lithium fluoride, sodium carbonate, and potassium chloride (at a gravimetric ratio of 2:1:1) was used as the alkali metal compound. This sample was placed in a furnace and then fired by being heated rapidly from room temperature to 1,000° C. and kept at this temperature for 24 hours, with the sample kept swept with a current of air and a current of nitrogen passed respectively at 300 ml/min and 100 ml/min. Consequently, there was obtained a sialon mass coated with an alkali metal-containing vitreous texture.

Then, the sialon mass was immersed for 15 minutes in a solution of 1 part by weight of an aqueous 46 wt % hydrofluoric acid solution in 3 parts by weight of distilled water. It was then placed in an aqueous ammonia solution to effect removal of residual hydrofluoric acid, washed with water, and dried. In the surface region of this mass, β-silicon nitride crystals 0.2 to 2 μm in thickness and 3 to 9 μm in length were uniformly formed.

EXAMPLES 8 through 26

Various sintered sialon pieces were treated using various alkali metal compounds, various reaction conditions, and various methods for removal of vitreous substance correspondingly shown in the table, to form fibrous crystals uniformly in the surface region of the sintered pieces. The results were as shown in Table 1.

TABLE 1

| Example No. | Sintered sialon[1] | Alkali metal compound Kind | Amount applied[2] (mg/cm²) | Air (nitrogen) current passed (ml/min) | Temperature (°C.) | Time (hr.) | Method for removal of vitreous substance[3] | Diameter (μm) and length (μm) of formed crystals |
|---|---|---|---|---|---|---|---|---|
| 8 | z = 1, R | lithium nitrate | 26 | 300 (200) | 1,000 | 20 | P | 1~2 5~10 |
| 9 | z = 1, N | lithium sulfate | 20 | 500 | 1,000 | 24 | P | 1~2 5~10 |
| 10 | z = 1, H | lithium chloride | 23 | 500 | 1,100 | 24 | F | 1~2 5~10 |
| 11 | z = 1, N | potassium flouride | 17 | 300 (200) | 1,000 | 24 | P | 1~1.2 3~8 |
| 12 | z = 1, N | potassium nitrate | 25 | 350 | 900~1,000 | 20 | F | 1~1.2 3~8 |
| 13 | z = 1, N | potassium sulfate | 19 | 400 (100) | 950 | 20 | P | 1~1.5 3~8 |
| 14 | z = 1, N | potassium silico fluoride | 13 | 300 | 950 | 24 | F | 1~1.5 3~9 |
| 15 | z = 1, N | sodium chloride | 19 | 400 | 1,000 | 18 | P | 0.5~1.5 3~8 |
| 16 | z = 1, H | sodium fluoride | 26 | 300 | 900~1,000 | 20 | P | 1~1.2 3~9 |
| 17 | z = 1, N | sodium nitrate | 17 | 300 | 1,000 | 18 | F | 1~1.5 3~8 |
| 18 | z = 1, R | potassium sulfate | 24 | 200 | 1,000 | 24 | F | 1~1.5 3~8 |
| 19 | z = 1, N | sodium silico fluoride | 21 | 200 | 1,000 | 20 | P | 1~1.5 3~8 |
| 20 | z = 2, N | lithium carbonate | 15 | 300 | 1,000 | 18 | P | 1~2 3~5 |
| 21 | z = 2, H | lithium nitrate | 25 | 200 | 900~1,000 | 20 | F | 1~2 3~5 |
| 22 | z = 2, N | potassium chloride | 18 | 400 (100) | 1,000 | 16 | P | 1~2 3~5 |
| 23 | z = 3, N | potassium nitrate | 24 | 300 | 950 | 20 | P | 1~1.5 2~3 |
| 24 | z = 3, N | sodium chloride | 23 | 300 | 950 | 16 | P | 1~2 3~4 |
| 25 | z = 3, N | sodium fluoride | 28 | 300 | 950 | 18 | F | 1~2 2~4 |
| 26 | z = 1, N | lithium carbonate potassium nitrate sodium carbonate (weight ratio: | 30 | 300 (200) | 950 | 24 | P | 0.2~2 3~9 |

TABLE 1-continued

| Example No. | Sintered sialon[1] | Alkali metal compound | | Reaction conditions | | | Method for removal of vitreous substance[3] | Diameter (μm) and length (μm) of formed crystals |
|---|---|---|---|---|---|---|---|---|
| | | Kind | Amount applied[2] (mg/cm$^2$) | Air (nitrogen) current passed (ml/min) | Temperature (°C.) | Time (hr.) | | |
| | | | 2:1:1) | | | | | |

(Note 1): H for hot press sintered piece, R for reaction sintered piece, and N for normal pressure sintered piece.
(Note 2): The amount applied means the amount of alkali metal used.
(Note 3): P: phosphoric acid solution F: hydrofluoric acid solution (Test for resistance to spalling and resistance to oxidation)

The sialon materials produced in Examples 1, 3, 4, 5 and 6 were subjected to 10 cycles of treatment wherein the material was alternately inserted for 20 minutes in a Kanthal Super box type electric furnace kept at 1,200° C. and suddenly cooled in the air at room temperature. At the end of the 10th cycle of this alternating treatment, none of the materials was found to entail such adverse phenomena as separation and exfoliation of the fibrous texture. The results show their ability to resist spalling.

By the test of 500 hours' heating at 1,200° C., they were examined as to the ability to resist oxidation, with the increase in weight due to heating as a criterion.

Separately, the normal-pressure ($z=1$) sintered piece and the hot-press sintered piece used in Examples 2 and 4 were similarly treated to determine their ability to resist spalling and oxidation. The results are shown in Table 2.

TABLE 2

| Example No. | | Sintered piece as raw material | Agent for coating | Increase in weight (mg/cm$^2$) 500 hours | Change in surface and fibrous cyrstals of sample |
|---|---|---|---|---|---|
| Sialon material according with invention | 1 | Normal-pressure ($z = 1$) sialon | Lithium carbonate | 0.29 | Fibrous texture |
| | 3 | Normal-pressure ($z = 1$) sialon | Potassium carbonate | 0.26 | Fibrous texture |
| | 4 | Hot-press ($z = 2$) sialon | Sodium carbonate | 0.30 | Fibrous texture |
| | 5 | Normal-pressure ($z = 2$) sialon | Lithium carbonate | 2.7 | Fibrous texture + vitreous texture |
| | 6 | Normal-pressure ($z = 3$) sialon | Lithium carbonate | 3.3 | Fibrous texture + vitreous texture |
| Untreated sialon | | Normal-pressure ($z = 3$) sialon | None | 0.5 | vitreous texture + pores |
| | | Hot-press ($z = 2$) sialon | None | 0.5 | vitreous texture + pores |

From the table, it will be noted that the surface regions of the untreated sialon materials were invariably deficient in resistance to spalling. In contrast, the sialon materials produced by the method of this invention showed no substantial change in fibrous texture and proved to be perfectly useful in terms of resistance to oxidation. (Production of silicon carbide material)

EXAMPLE 27

On the surface (5.8 cm$^2$ in area) of a normal-pressure sintered silicon carbide piece heated to about 100° C., a solution of 2 g of lithium carbonate, 1.2 g of starch, and 10 mg of methyl cellulose in 20 ml of distilled water was uniformly applied with a caligraphy brush in an amount calculated to distribute lithium at a rate of 20 mg per cm$^2$. The applied layer of the solution was then dried. The sample thus obtained was mounted on a boat of silicon carbide, set in place roughly at the center of a high-alumina combustion tube, and fired at 1,100° C. for 24 hours, with the sample kept swept with a current of air passed at a rate of 500 ml/min. Consequently, there was obtained a silicon carbide mass uniformly coated with a vitreous texture of lithium. This mass, on observation under a metallurgical microscope, was found to possess a vitreous phase containing cracks and pores. On analysis by the X-ray diffraction, it was found to form β-SiC and tridymite crystals.

Figure 2:
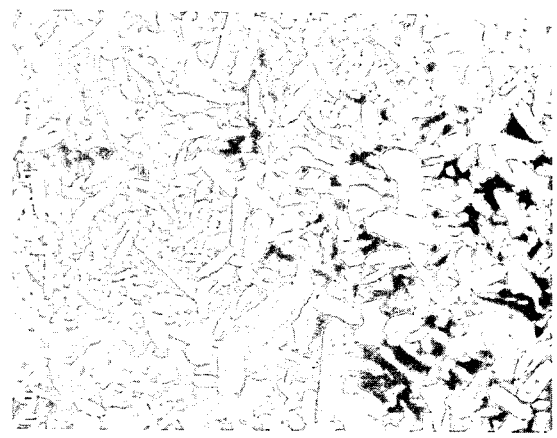
FIG. 2 illustrates the crystalline structure in the surface region of a silicon carbide material produced in Example 27, photographed under a scanning electron microscope at 1,000 magnifications.

Then, the silicon carbide mass was placed in 12 ml of a phosphoric acid solution and heated therein to effect removal of water by vaporization. It was then gradually heated to 280° C., kept at this temperature for 15 minutes, removed from the solution, washed with water, and dried. This treatment resulted in thorough removal of the vitreous phase. Then, the surface region of this mass was observed under a scanning electron microscope. A photograph (1,000 magnifications) of the texture taken through this microscope is shown in FIG. 2. The photograph clearly shows that fibrous crystals 2 to 3 μm in thickness and 5 to 10 μm in length accompanied by partially flat crystals were formed throughout the surface region. The crystalline phase, on analysis by the powder 7 X-ray diffraction, was found to be a single phase of β-silicon carbide.

EXAMPLE 28

On the surface of a hot-press sintered silicon carbide piece, a solution of 2 g of lithium carbonate, 800 mg of sugar, and 12 mg of methyl cellulose in 20 ml of distilled water was applied with a caligraphy brush in an amount calculated to distribute lithium at the rate of 20 mg per cm$^2$. The applied layer of the solution was dried. In the same furnace as used in Example 27, this sample was fired by being heated rapidly from room temperature to 950° C., then heated slowly to 1,100° C. over a period of 16 hours, and kept at this temperature for 8 hours, with the sample kept swept with a current of dry air passed at a rate of 500 ml/min.

As a result, there was obtained a silicon carbide mass uniformly coated with a vitreous texture of lithium. By observation under a metallurgical microscope, this mass was found to contain a vitreous phase containing cracks throughout the entire surface. On analysis by the X-ray diffraction, it was found to form β-silicon carbide and tridymite crystals.

Subsequently, the silicon carbide mass was placed in 12 ml of phosphoric acid solution, heated therein at 280° C. for 15 minutes, removed from the solution, and dried. The surface region of the mass, on observation under a scanning electron microscope, was found to form fibrous crystals 2 to 3 μm in thickness and 5 to 10 μm in length accompanied by partially flat crystals throughout the texture. This crystalline phase, on analysis by the powder X-ray diffraction, was found to be a single phase of β-silicon carbide.

EXAMPLE 29

A sample was prepared by following the procedure of Example 28, except that sodium carbonate was used in place of lithium carbonate and 400 mg of emission spectral analysis grade carbon was used as a carbonaceous substance. The sample was placed in a furnace and fired by being heated rapidly from room temperature to 1,000° C. and kept at this temperature for 24 hours, with the sample kept swept with a current of air and a current of argon passed respectively at 300 ml/min and 100 ml/min. Consequently, there was obtained a silicon carbide mass coated with a vitreous texture of sodium silicate.

This mass, on observation under a metallurgical microscope, was found to form tridymite crystals throughout the entire texture and entail melt bubbling. Since the sodium salt was apt to react suddenly, desirable results were obtained by introducing argon into the reaction system, lowering the partial pressure of oxygen and, at the same time, lowering the reaction temperature.

Then, the silicon carbide mass was treated with 46 wt % hydrofluoric acid, washed with water, and dried. In the surface region of this mass, crystals 2 to 3 μm in thickness and 4 to 7 μm in length accompanied by partially flat crystals were formed throughout the entire texture. The crystalline texture, on analysis by the X-ray diffraction, was found to be a single phase of β-silicon carbide.

EXAMPLE 30

A sample was prepared by following the procedure of Example 27, except that potassium carbide was used in place of lithium carbonate. This sample was placed in a furnace and fired by being heated rapidly from room temperature to 1,100° C. and kept at this temperature for 24 hours, with the sample kept swept with a current of air and a current of argon passed respectively at 300 ml/min and 100 ml/min. Consequently, there was obtained a silicon carbide mass coated with a potassium-containing vitreous texture. In the texture which consisted mostly of a vitreous phase, tridymite crystals were formed in a closely packed state.

Then, the silicon carbide mass was placed for 15 minutes in a solution of 1 part by weight of 46 wt % hydrofluoric acid in 2 parts by weight of distilled water. It was then placed in an aqueous ammonia solution to effect removal of residual hydrofluoric acid, washed with water, and dried. In the surface region of the mass, fibrous crystals 2 to 3 μm in thickness and 5 to 10 μm in length accompanied by flat crystals were formed throughout the entire texture. The crystalline texture, on analysis by the powder X-ray diffraction, was found to be a single phase of β-silicon carbide.

EXAMPLE 31

A sample was prepared by following the procedure of Example 27, except that a mixture consisting of lithium fluoride, potassium chloride, and sodium carbonate (gravimetric ratio of 2:1:1) was used as an alkali metal compound. This sample was placed in the furnace and fired by being heated rapidly from room temperature to 1,000° C., then heated slowly to 1,100° C. over a period of 16 hours, and kept at this temperature for 8 hours, with the sample kept swept with a current of air and a current of argon passed respectively at 300 ml/min and 100 ml/min. Consequently, there was obtained a silicon carbide mass coated with an alkali metal-containing vitreous phase.

Then, this silicon carbide mass was placed for 15 minutes in a solution of 1 part by weight of 46 wt % of hydrofluoric acid in 3 parts by weight of distilled water. It was subsequently placed in an aqueous ammonia solution to effect removal of residual hydrofluoric acid, washed with water, and dried. In the surface region of the mass, 2 fibrous crystals 2 to 3 μm in thickness and 5 to 11 μm in length accompanied by partially flat crystals were formed throughout the entire texture. This crystalline texture, on analysis by the powder X-ray diffraction, was found to be a single phase of β-silicon carbide.

EXAMPLES 32 through 45

The sintered silicon carbide pieces indicated in Table 3 were treated using various alkali metal compounds, various reaction conditions, and various methods for removal of vitreous substance correspondingly indicated, to form fibrous β-silicon carbide crystals uniformly in the surface region of the sintered pieces. The results are shown in Table 3.

TABLE 3

| Example No. | Sintered silicon carbide[1] | Alkali metal compound Kind | Amount applied[2] (mg/cm²) | Air (argon) current passed (ml/min) | Temperature (°C.) | Time (hr) | Method for removal of vitreous substance[3] | Diameter (μm) and length (μm) of formed crystals |
|---|---|---|---|---|---|---|---|---|
| 32 | H | lithium sulfate | 18 | 300 (200) | 1,050 | 20 | P | 2~3 5~15 |
| 33 | H | potassium nitrate | 23 | 500 | 1,100 | 24 | F | 2~3.5 5~12 |
| 34 | R | lithium chloride | 21 | 500 | 1,000~1,100 | 24 | P | 2~3 5~10 |
| 35 | N | potassium carbonate | 25 | 400 (100) | 1,050 | 24 | P | 2~3 5~12 |
| 36 | R | potassium flouride | 15 | 300 | 1,100 | 20 | F | 2~3 5~10 |
| 37 | H | potassium nitrate | 19 | 400 | 1,050 | 24 | P | 2~3 5~10 |

TABLE 3-continued

| Example No. | Sintered silicon carbide[1] | Alkali metal compound | | Reaction conditions | | | Method for removal of vitreous substance[3] | Diameter (μm) and length (μm) of formed crystals |
|---|---|---|---|---|---|---|---|---|
| | | Kind | Amount applied[2] (mg/cm²) | Air (argon) current passed (ml/min) | Temperature (°C.) | Time (hr) | | |
| 38 | R | potassium sulfate | 16 | 300 (200) | 1,000~1,100 | 20 | P | 2~3 5~10 |
| 39 | R | potassium silico fluoride | 15 | 300 | 1,100 | 24 | F | 2~3 5~10 |
| 40 | H | sodium chloride | 20 | 500 | 1,000~1,100 | 20 | P | 2~3 4~7 |
| 41 | N | sodium fluoride | 23 | 300 | 1,050 | 20 | F | 2~3 4~7 |
| 42 | H | sodium nitrate | 17 | 400 | 1,100 | 20 | P | 2~3 4~7 |
| 43 | R | sodium sulfate | 19 | 300 (200) | 1,100 | 24 | F | 2~3 4~7 |
| 44 | N | sodium silico fluoride | 22 | 300 | 1,050 | 24 | P | 2~3 4~6 |
| 45 | H | lithium carbonate potassium carbonate sodium fluoride (weight ratio: 2:2:1) | 28 | 300 | 1,000~1,100 | 24 | F | 2~3 5~12 |

(Note 1): H for hot-press sintered piece, R for reaction sintered piece, and N for normal pressure sintered piece.
(Note 2): The amount applied means amount of alkali metal used.
(Note 3): P: phosphoric acid solution F: hydroflouric acid solution (Test for resistance to spalling and resistance to oxidation)

The silicon carbide materials produced in Examples 27, 28, 35 and 29 were subjected to 10 cycles of treatment wherein the material was alternately inserted for 20 minutes in a Kanthal Super box type electric furnace kept at 1,200° C. and suddenly cooled in the air. These materials were found not to entail such adverse phenomena as separation and exfoliation of the fibrous texture and proved to be thoroughly capable of resisting spalling.

By the test of 500 hours' heating at 1,200° C., they were examined as to the ability to resist oxidation, with the increase in weight by heating used as a criterion.

Separately, the normal-pressure sintered silicon carbide piece and the hot-press sintered silicon carbide piece used in Example 27 and Example 28 were similarly treated to determine their ability to resist spalling and oxidation. The results are shown in Table 4.

TABLE 4

| Example No. | | Sintered piece as raw material | Agent for coating | Increase in weight (mg/cm²) 500 hours | Change in surface and fibrous cyrstals of sample |
|---|---|---|---|---|---|
| Silicon carbide material according with invention | 27 | N | Lithium carbonate | 0.21 | Fibrous texture |
| | 28 | H | Lithium carbonate | 0.14 | Fibrous texture |
| | 35 | N | Potassium carbonate | 0.19 | Fibrous texture |
| | 29 | H | Sodium carbonate | 0.20 | Fibrous texture |
| Untreated silicon carbide | | N | None | 0.27 | vitreous texture + pores + cracks |
| | | H | None | 0.18 | vitreous texture + pores + cracks |

It will be noted from the table that the surface regions of the untreated silicon carbide materials were deficient in resistance to spalling. In contrast, the silicon carbide material produced by the method of this invention showed absolutely no change in fibrous texture and proved to be perfectly useful in terms of resistance to oxidation.

What is claimed is:

1. A method for the production of an oxidation-resistant silicon carbide material possessing a phase of closely packed crystals in the surface region thereof, which method consists essentially of:

coating a surface of a silicon carbide substrate with a layer of a mixture of at least one alkali metal compound selected from the group consisting of halogenides, carbonates, nitrates and sulfates of alkali metals and at least one carbonaceous substance selected from the group consisting of elementary carbon and hydrocarbons, firing the resultant coated substrate at a temperature in the range of 800° to 1300° C. in the presence of oxygen, thereby forming on the surface of said silicon carbide substrate a coated layer consisting substantially of an alkali metal-containing vitreous substance and crystallizing the surface of said silicon carbide substrate, and subsequently removing said coated layer to expose the crystallized surface of said silicon carbide substrate.

2. The method of claim 1, wherein said alkali metal is at least one member selected from the group consisting of lithium, potassium and sodium.

3. The method of claim 1, wherein the gravimetric ratio of said alkali metal compound to said carbonaceous substance is in the range of 1:0.to 1:2.

4. The method of claim 1, wherein said layer of the mixture of alkali metal compound and carbonaceous substance is formed in an amount such that said alkali metal is distributed at a rate in the range of 2 to 30 mg per cm² of surface area.

5. The method of claim 1, wherein said coated layer is removed by the use of one member selected from the group consisting of a phosphoric acid solution and a hydrofluoric acid solution.

6. The method of claim 1, wherein said hydrocarbon is a sugar or starch.

* * * * *